United States Patent
Kraft et al.

(10) Patent No.: US 7,175,764 B2
(45) Date of Patent: Feb. 13, 2007

(54) METHOD AND DEVICE FOR PURIFYING WASTEWATERS

(75) Inventors: Harald Kraft, Oberkirch-Nussbach (DE); Hans-Thomas Armbruster, Ahcern-Grossweier (DE); Wendelin Benz, Oberkirch-Zusenhofen (DE)

(73) Assignee: Papierfabarik August Koehler AG, Oberkirch (DE)

( * ) Notice: Subject to any disclaimer, the term of this patent is extended or adjusted under 35 U.S.C. 154(b) by 0 days.

(21) Appl. No.: 10/490,250

(22) PCT Filed: Oct. 1, 2002

(86) PCT No.: PCT/EP02/11008

§ 371 (c)(1),
(2), (4) Date: Sep. 17, 2004

(87) PCT Pub. No.: WO03/029152

PCT Pub. Date: Apr. 10, 2003

(65) Prior Publication Data

US 2005/0023216 A1 Feb. 3, 2005

(30) Foreign Application Priority Data

Oct. 1, 2001 (DE) ................. 101 48 474

(51) Int. Cl.
C02F 3/00 (2006.01)
(52) U.S. Cl. ............... 210/607; 210/609; 210/620; 210/628; 210/196; 210/197; 210/745
(58) Field of Classification Search ............... 210/745, 210/196, 197, 607, 609, 620–628
See application file for complete search history.

(56) References Cited

U.S. PATENT DOCUMENTS

| 3,892,659 | A | * | 7/1975 | Kirk ..................... 210/621 |
| 4,083,785 | A |   | 4/1978 | Bernard et al. |
| 5,554,289 | A |   | 9/1996 | Grounds |
| 5,824,222 | A | * | 10/1998 | Keyser et al. ............ 210/607 |

FOREIGN PATENT DOCUMENTS

| DE | 43 26 603 A1 |   | 2/1995 |
| JP | 61061699 A | * | 3/1986 |

OTHER PUBLICATIONS

Patent Abstracts of Japan, vol. 012, No. 127, May 21, 1988, Hitachi Plant Eng. & Constr. Co. Ltd., Abstract.
Patent Abstract of Japan, vol. 010, No. 226, Aug. 7, 1986, Ebarra Infilco Co. Ltd., Abstract.
Patent Abstracts of Japan, vol. 011, No. 003, Jan. 7, 1987, Kurita Water Ind. Ltd., Abstract.
Bradke, Hans-Joachim, "Abwasserreinigung: Leistungubersicht der Anlagenhersteller in der Bundesrepublik Deutschland", 1982.

* cited by examiner

*Primary Examiner*—Chester T. Barry
(74) *Attorney, Agent, or Firm*—Darby & Darby (57) ABSTRACT

The invention relates to a method for purifying wastewaters, particularly wastewaters produced in the paper industry, involving the following steps: a) aerobic clarification of the wastewater using activated sludge in an activation stage; b) carrying out, in a secondary settling tank, a subsequent clarification of a portion of the wastewater/activated sludge mixture leaving the activation stage; c) desiccating, in a desiccation unit, another portion of the wastewater/activated sludge mixture leaving the activation stage; d) returning at least a portion of the activated sludge removed in steps b) and c) into the activated sludge tank.

20 Claims, 5 Drawing Sheets

METHOD AND DEVICE FOR PURIFYING WASTEWATERS

The invention concerns a method and a device to purify wastewaters, in particular wastewaters occurring during paper production.

Biological wastewater purifying plants to purify wastewaters occurring in paper factories are currently widely used. Plants of this type generally have an aerobic activation stage as well as a subsequent clarification stage. In the activation stage adapted microorganisms are present as activated sludge, these microorganisms decomposing, by using oxygen, the organic materials contained in the wastewater. The end products of these processes are common carbon monoxide, water and biomass. A separation of the activated sludge/water mixture is carried out in secondary settling tanks, connected downstream from the activation stage. Such a plant is disclosed, for example, in the publication PTS-MS 10/94 "Operation of biological wastewater purifying plants in paper factories, monitoring, control and optimisation" of the Papiertechnische Stiftung, Hessstrasse 134, 80797 München, Germany.

From DE 43 26 603 a clarification plant with an activation tank and a secondary settlement connected downstream from it is known. The activated sludge carried in the wastewater settles in the secondary settling tank and is returned to the activation tank. Because in the case of the suddenly occurring large quantities of wastewater, as those occurring during rain, there is the danger that too much activated sludge is conveyed from the activation tank to the secondary settling tank and consequently the activation tank no longer can fulfil its clarifying function, in the case of this known clarification plant a branching-off is provided between the activation tank and the secondary settling tank, through which in the case of large quantities of wastewaters a part-stream of the wastewater flowing from the activation tank to the secondary settling tank is guided through a sieving device and following this can be conveyed again to the rest of the wastewater stream before the secondary settling tank. In these exceptional cases activated sludge can be filtered out from the branched-off wastewater with the aid of the sieving device and returned again to the activation tank. tank by the flow, through which the activated sludge is conveyed from the secondary settlement tank to the wastewater inlet of the activation tank.

The object of the invention is to increase the hydraulic capacity of a generic device and a method appropriate for it and to make an optimal use of the existing biological capacity. According to the invention this objective is achieved by a method according to claim 1 and a device according to claim 12.

The method according to the invention has the following steps of the process: a) aerobic clarification of the wastewater by activated sludge in an activation stage; b) subsequent clarification, in a secondary settling tank, of a portion of the wastewater/activated sludge mixture, exiting from the activation stage; c) dehydration, in a dehydrating unit, of another portion of the wastewater/activated sludge mixture exiting from the activation stage; d) returning at least a portion of the activated sludge separated in steps b) and c) into the activated sludge tank; e) bringing together the purified wastewater from the secondary settling tank (2) and the dehydrating unit (3) after returning the activated sludge.

An appropriate device has an activation stage for the aerobic clarification of the wastewater, a secondary settling tank for the fluid/solid matter separation as well as a dehydrating unit to dehydrate the sludge, while both the secondary settling tank and the dehydrating unit are connected with the activation stage (1) by means of at least two pipeline systems each to return the activated sludge and the discharge of the secondary settling tank (2) as well as the discharge of the wastewater unit (3) are connected with one another to bring together the purified wastewater. One pipeline each leads on this occasion from the discharge of the activation stage to the secondary settling tank or the dehydrating unit and serves as a supply line of the wastewater/activated sludge mixture. One further pipeline each serves for the return of the activated sludge, concentrated in the secondary settling tank and the dehydrating unit, into the activated stage.

The return of the sludge from the dehydrating unit and the secondary settling tank is necessary to provide again in this manner the biomass required for the activating system, so that the aerobic system will be stabilised in the activation.

U.S. Pat. No. 4,083,785 discloses a clarification plant with an activation tank and a secondary settling tank. The activation tank is divided into two chambers connected with one another by the flow. The wastewater flows from the first chamber into the second chamber of the activation tank and from there to the secondary settling tank. The activated sludge, that settled in the secondary settling tank, is returned to the first chamber via a first return line. In the second chamber additionally a settling system is provided, in which the excess activated sludge, discharged from the first chamber into the second chamber, can settle. The settling system is connected via a second return line, with the first chamber by the flow so that to return the activated sludge settled in it to the first chamber.

JP 62 279807 discloses a clarification plant, wherein a plurality of parallel connected filtering plants are connected downstream from the activation tank, these filtering plants filtering the activated sludge from the wastewater and returning it to the activation tank.

From JP 61 061699 a clarification plant with an activation tank and a downstream connected secondary settling tank is known. Directly before the discharge into the secondary settling tank a settling system is provided in the activation tank, in which the activated sludge can settle. Following the activated sludge contained in the settling system is conveyed to the wastewater inlet of the activation sludge and thus reaches again the activation tank. Furthermore, the secondary settling tank is also connected via a return line with the wastewater inlet of the activation tank, so that to return activated sludge collected in the secondary settling tank.

JP 61 181595 discloses a clarification plant with an activation tank and a downstream connected secondary settling tank. A portion of the wastewater flowing from the activation tank is guided through a filtering plant, in which activated sludge is filtered from the wastewater. The filtered out activated sludge is returned to the activation tank, while the filtered wastewater is conveyed first to a flocculation plant. After flocculating the suspended substance, the thus pre-clarified wastewater is conveyed to the secondary settling tank. Via a return line the secondary settling tank is connected to the wastewater inlet of the activation The return of the sludge will particularly prevent or minimise an impairment of the wastewater purification by bio-sludge losses.

The first stage, namely the aerobic clarification of the wastewater in an activation stage by using activated sludge, corresponds to that of the state-of-the-art. Differently, however, from the state-of-the-art, not the entire bio-sludge/water mixture discharged from the activation stage is conveyed to the secondary settling tank, but only a portion of it.

The other portion is dehydrated in a dehydrating unit in a parallel step of the process. In this conjunction the concentrated bio-sludge produced is returned to the activation stage both from the secondary settling tank and the dehydrating unit. Afterwards the purified water, exiting from the secondary settling tank and the dehydrating unit, can be conveyed, for example, directly or via a filter purification stage to a draining canal. By virtue of the method according to the invention the hydraulic load of the activation stage as well as of the subsequent clarification is reduced to a minimum.

Within the scope of this invention it has been considered to completely dispense with the secondary settling tanks and use only the dehydrating unit instead of them. However, it has become clear that, when using only a dehydrating unit, it is difficult to control the strong hydraulic variations in the inlet. Only the combination of the classic subsequent clarification with additional dehydration allows an optimisation of the method adapted to suit the prevailing conditions.

The return of the sludge will particularly prevent or minimise an impairment of the wastewater purification by bio-sludge losses.

The first stage, namely the aerobic clarification of the wastewater in an activation stage by using activated sludge, corresponds to that of the state-of-the-art. Differently, however, from the state-of-the-art, not the entire bio-sludge/water mixture discharged from the activation stage is conveyed to the secondary settling tank, but only a portion of it. The other portion is dehydrated in a dehydrating unit in a parallel step of the process. In this conjunction the concentrated bio-sludge produced is returned to the activation stage both from the secondary settling tank and the dehydrating unit. Afterwards the purified water, exiting from the secondary settling tank and the dehydrating unit, can be conveyed, for example, directly or via a filter purification stage to a draining canal. By virtue of the method according to the invention the hydraulic load of the activation stage as well as of the subsequent clarification is reduced to a minimum.

Within the scope of this invention it has been considered to completely dispense with the secondary settling tanks and use only the dehydrating unit instead of them. However, it has become clear that, when using only a dehydrating unit, it is difficult to control the strong hydraulic variations in the inlet. Only the combination of the classic subsequent clarification with additional dehydration allows an optimisation of the method adapted to suit the prevailing conditions.

As dehydrating unit a decanter, a settling plant or a concentrating plant, for example, may be used. According to an advantageous embodiment of the invention the dehydrating unit has a sieve belt filter. Therefore the dehydration in stage c) is carried out in a sieve belt filter as the dehydrating unit. The activated sludge removed from the sieve belt dehydration contains markedly less water than the conventional activated sludge from the secondary settling tank. The solid matter contents in the activated sludge removed by the sieve belt dehydration is approx. 10 times that of the activated sludge from the secondary settling tank. This means, that the activated sludge returned to the activation stage contains less water. Thus the hydraulic load is lowered in comparison with a conventional subsequent clarification by the difference of the corresponding concentrations of the solid matters in the wastewater/activated sludge mixture. The consequence of this is also an increased contact time of the wastewater with the biomass in the activation stage. Thus, with the dimension of the activation stage remaining the same, an increase of the hydraulic load, i.e. of the supplied wastewater, is feasible.

In the case of a sieve belt filter one deals with a sieve table, with an endless sieve belt moving above it. For this purpose two or more deflecting rollers are used. The endless belt is preferably made of a synthetic mesh and has a sieve structure. The dehydrating process is affected by the sieve structure. The wastewater/activated sludge mixture is placed on the sieve table and is dehydrated through the sieve, whereby the concentrated sludge falls into a funnel for a suitable further treatment. To support the removal of the thick sludge obtained, it can be, for example, scraped off the surface of the sieve belt. Material remaining hanging (and not removed) in the sieve can be removed from the sieve belt mesh either by spraying water from the interior of the sieve belt table or by compressed air. The use of compressed air is particularly advantageous, because a diluting effect for the activated sludge, that may occur when using sprayed water, is prevented by this. The spray nozzles used for the cleaning of the sieve are preferably positioned perpendicularly to the sieve. The supply of these spray nozzles can be either by an external pump and/or by a partial stream of the clear filtrated material, that is removed and separately carried away. The further conveying of the filtered solid matters takes place, for example, by a screw conveyor or by gravity, while the sieve cleaning water of the filter ensures the necessary capacity to flow. The filtered water is collected, for example, in an enclosed bottom of the sieve belt dehydrating unit and removed via pipelines.

The wastewater/activated sludge mixture exiting from the activation stage is preferably conveyed to the dehydrating unit with constant flow capacity. Therefore in the case of an appropriate device for the purification of wastewaters a device for the constant conveying of the wastewater/activated sludge mixture from the activation stage to the dehydrating unit is used. This means, that the dehydrating unit is continuously supplied from the activation stage with a constant flow of wastewater/activated sludge mixture. Thus only the remaining portion of the of the wastewater/activated sludge mixture exiting from the activation stage is introduced into the secondary settling tank. In this manner fluctuations in the wastewater region can be compensated for via the secondary settling tank.

When in the scope of the invention one speaks about a dehydrating unit or a sieve belt filter, it should not have a limiting affect. Thus it is feasible to divide the discharge from the activation stage not into two, but into three or more streams, of which two or more streams are conveyed to two or more dehydrating units, in particular sieve belt filters. In this manner one activation stage can be used to supply a plurality of dehydrating units or vice versa.

To transport the wastewater/activated sludge mixture from the activation stage to the dehydrating unit preferably a centrifugal pump is used. The advantage of the centrifugal pump is a continuous output, i.e. the wastewater/activated sludge mixture is continuously conveyed to the dehydrating unit. A further advantage is the compact construction of this type of pump, consequently requiring only a small space.

According to a preferred embodiment of the invention the activation stage comprises at least one, preferably two to five, biodisks. Thus the aerobic clarification is carried out by using one or more biodisks. Such biodisks, also described as immersion percolating bodies, are basically constructed from rotating plastic disks. The diameter of such biodisks is generally between 2 and 5 m, while when using a plurality of biodisks they are preferably at a distance of 15–20 mm from one another. The disks rotate on a common shaft, while they are immersed approximately up to half to the wastewater to be purified. The biological decomposition of the organic materials takes place both on the surface of the biodisks and in the water phase, where the microorganisms are active. According to an alternative execution the activation tank may be constructed as biodisks or as aerated tanks.

If required, the purified wastewater from the secondary settling tank can be conveyed to a further filtering system. For this purpose in the case of the device according to the invention a filtering system is connected downstream from the secondary settling tank. The filtering system serves the purpose of further purification and filtering of the biologically purified wastewater. Depending on the degree of purification required, various filters can be used for the removal of very fine tissues. At the same time filtered materials are preferably returned to the inlet for activation. The water, purified by the further filtering system, can then be conveyed to the draining canal or collected in a clear water tank for reuse.

The further filtering system preferably comprises a twin-layer system. Twin-layer filters are generally known and comprise two layers, one layer from a finer and one layer from a coarser material, while the coarser layer is on the top. The passing through of the water to be purified takes place, just like in the case of the sieve belt filter, in a downward direction. At specified intervals, the duration of which depends from the level of contamination as well as the throughput, a backwash is usually carried out to clean the filter. The original layer structure will be reinstated subsequently. Such a filtering in a twin-layer filter can be advantageous or necessary when the discharge values from the subsequent clarification and/or the sieve belt dehydration are not low enough to enable to convey the stream directly to the draining canal.

According to an advantageous embodiment of the invention the filtering system is connected also with the dehydrating unit via a discharge of same. Thus the purified wastewater from the dehydrating unit can be fully or partially conveyed to the further filtering system. In this manner both a final filtering of the purified wastewater exiting from the secondary settling tank and of the purified wastewater exiting from dehydrating unit is carried out in the filtering system.

Depending on the level of contamination a mechanical clarification stage may be connected upstream from the activation stage. Examples of such mechanical clarification stage are rakes, secondary settling tanks or sieve belt filters. The clarifying means mentioned can be used either on their own or in combination. Once again, when using a sieve belt filter, a constant partial stream treatment is recommended, whereas in pre-clearing tanks a variable partial stream treatment can be carried out. To cushion the spasmodically increased quantities of wastewater the use of buffer tanks has proved itself as advantageous. To prevent putrefaction, an oxidising agent, for example, may be introduced to the mechanical clarification stage.

The consistency of the sludge concentrated with the aid of the dehydrating unit or the sieve belt filter can be influenced by adding flocculants. For this purpose a metering device is preferably provided in the dehydrating unit to supply the flocculant. This metering device may be provided, for example, in the pipeline between the device to transport the activated sludge/water mixture or the centrifugal pump and the dehydrating unit or the sieve filter. The metering device has preferably such a construction, that a forced mixing of the flocculant, introduced with the wastewater/activated sludge mixture, will be carried out. This can be achieved, for example, by a tangential inlet and outlet of the sludge/water mixture. In the case of the metering device one can deal, for example, with a suitable pump. The intensity of the mixing can be further influenced by specially installed components, for example vortex paths, static mixers or rotor/stator systems.

The treatment of the wastewater/activated sludge mixture in the dehydrating unit is preferably automatically controlled. For this purpose a suitable measuring device to measure the solid matter contents of the purified wastewater is connected downstream from the dehydrating unit. Furthermore, a control device is present, controlling the metering device as a function of the solid matter contents measured by the measuring device. An example of a measuring device is a turbidity/solid matters sensor. As an alternative UV spectroscopy may also be used. If the solid matter contents increases in the filtrate water, a signal is given to the control device, by virtue of which the conveying capacity of the metering device, for example of a flocculant pump, is gradually increased. The control can be so adjusted that, for example, the setting remains in each case for approximately 10 minutes after the quality of the filtrate had been achieved. After 10 minutes the metering device is again gradually restored.

In addition of adding flocculants, the consistency of the concentrated sludge can also be influenced by the sieving velocity. Thus there is a further possibility to control the method according to the invention. A further option to ensure the desired turbidity contents in the filtrated water is by varying the supply pump within its capacity range in conjunction with the aforementioned metering device. If an increased solid matter contents is measured in the filtrate water, a signal is given to the device for conveying or the centrifugal pump, that is then slowed down. The supplied quantity of the wastewater/activated sludge mixture is reduced gradually in this manner. This kind of control can be used on its own or in combination with the control mechanisms mentioned before.

A possibility of the combined control is, for example, to increase first the conveying capacity of the flocculent metering device when the turbidity contents is high in the purified wastewater. If the optimum conveying capacity is reached and the turbidity contents in the purified wastewater still remains too high, the supply of the flocculent to the dehydrating device is reduced. The control can be so designed, that when reaching 50% of the maximum conveying capacity of the conveying device with simultaneously optimised usage of the flocculant, the dehydration process is interrupted after 20 minutes, so that the plant can be manually adjusted again.

The activated sludge separated in the secondary settling tank preferably has a solid matters concentration of approx. 2.5 g/L to approx. 7 g/L and in particular approx. 4 g/L to approx. 5.5 g/L. To achieve higher solid matter concentrations in the activated sludge by using a secondary settling tank is difficult. In addition, when not achieving or exceeding these values, disadvantages occur, leading to the impairment of the system.

In contrast to this, the activated sludge separated in the dehydrating unit contains solid matters with a concentration of approx. 30 g/L to 60 g/L, in particular approx. 35 g/L to 55 g/L. Consequently, the concentration of solid matters in the activated sludge in the case of the dehydrating unit, a sieve belt press for example, is increased by approximately 10 times compared with that from the secondary settling tank.

The invention is described in the following in detail based on an example and referring to the attached drawings.

Figure 1:
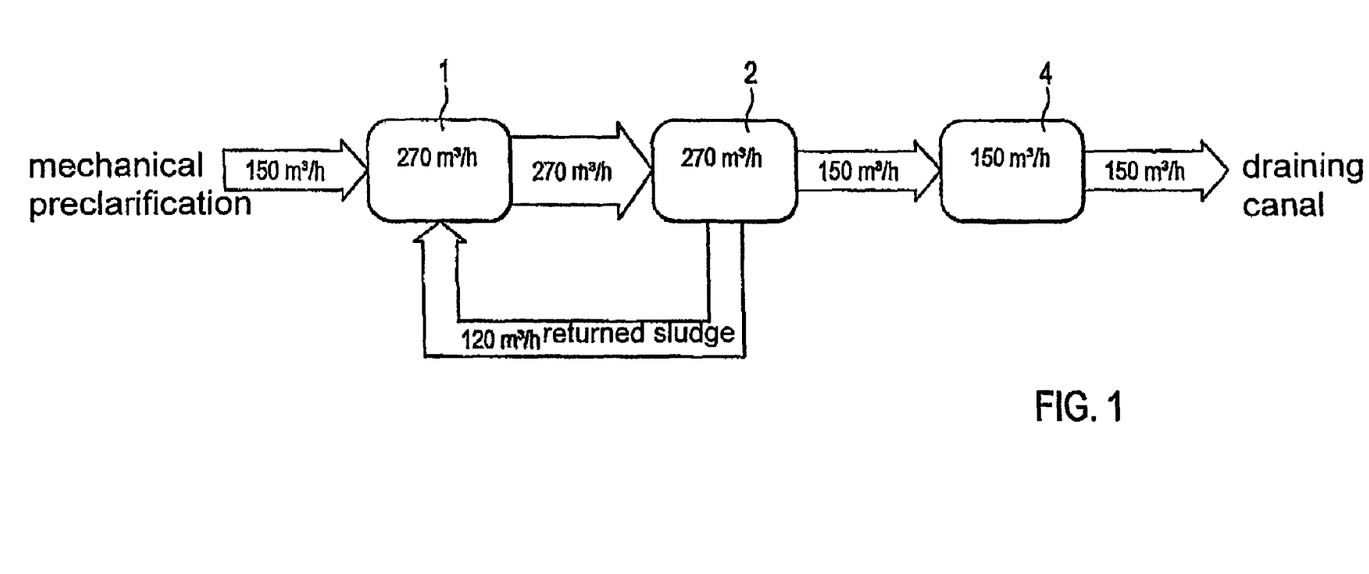
FIG. 1—a wastewater clarification plant for the paper industry according to the state-of-the-art.

In FIG. 1 the reference numeral 1 designates in general an activation stage. In the case of an upstream connected percolating filter its charging is preferably carried out with pumps having rotational speed control. The control of the charging of the percolating filter is carried out when a second bio-stage is connected downstream from the percolating filter, preferably as a function of the oxygen contents of the second bio-stage. If the biological decomposition stage contains biodisks, then one preferably deals here with several, for example four, biodisks connected in series with a drive having rotational speed control. Preferably after the second and fourth biodisk the oxygen is measured and is used for the control of the rotational speed of the biodisks. As this is customary, a nutrient salt solution is added, preferably to the inlet of the activation stage, should this be found to be necessary.

According to the state-of-the-art the overflow from the activation stage 1 enters fully into a secondary settling tank 2. The separation of the activated sludge/wastewater mixture takes place in the secondary settling tank 2 into clear water that is free, as far as possible, from solid matters, and activated sludge. Furthermore, a retention, concentration and storage of the activated sludge takes place. The usual embodiments of a secondary settling tank are rectangular or round tanks. The settled activated sludge is returned to the activation stage via a return line. As an example, sludge scrapers or suction chambers, the latter working on the Heber principle, may be used for this purpose. The return of the sludge may be continuous or interrupted.

In this embodiment the filtered water, exiting the secondary settling tanks, is conveyed to an optional further filtering stage, for example a twin-layer example, that is designated in this case with the reference numeral 4. Even the finest solid particles, as well as bio-sludge particle aggregates up to a size of approx. 1 to 5 mm can be filtered out in this. Following this, the pure water exiting from this filter can be either collected in a clear water tank or directly supplied to the draining canal.

An example for a possible layout of the plant shown in FIG. 1 (according to the state-of-the-art) is shown in the following:

| | | |
|---|---|---|
| Activation stage: | Wastewater supply: | 150 m³/h |
| | Capacity: | 350 m³/h |
| | Dwell time: | 2.33 h (calculated from the capacity of 350 m³/h and waste water supply 150 m³/h = 2.33 h) |
| Secondary settling tank: | Settling tank area: | 198 m² |
| | Capacity of settling tank: | 653 m³ |
| | Charging of settling tank area: | 0.76 m/h (calculated from wastewater supply 150 m³/h and settling tank area 198 m² = 0.76 m/h) |
| | Dwell time: | 4.35 h (calculated from capacity of settling tank 653 m³ and wastewater supply 150 m³/h) |

The above data have been derived theoretically. If the actual operating conditions, i.e. the return of the activated sludge from the secondary settling tanks 2 to the activation stage 1 is taken into account, the following conditions will result:

| | | |
|---|---|---|
| Activation path: | Wastewater supply, incl. return flow: | 270 m³/h |
| | Capacity: | 350 m³/h |
| | Actual dwell time: | 1.30 h |
| Secondary settling tanks: | Settling tank area: | 198 m² |
| | Capacity of settling tank: | 653 m³ |
| | Returned sludge: | 120 m³/h |
| | Actual charging of the area: | 1.36 m/h |
| | Actual dwell time: | 2.42 h |

It is clear from this comparison, that when the returned activated sludge is not taken into consideration, the basic hydraulic parameters of the plant are neglected during the general conventional dimensioning of plants.

Figure 2:
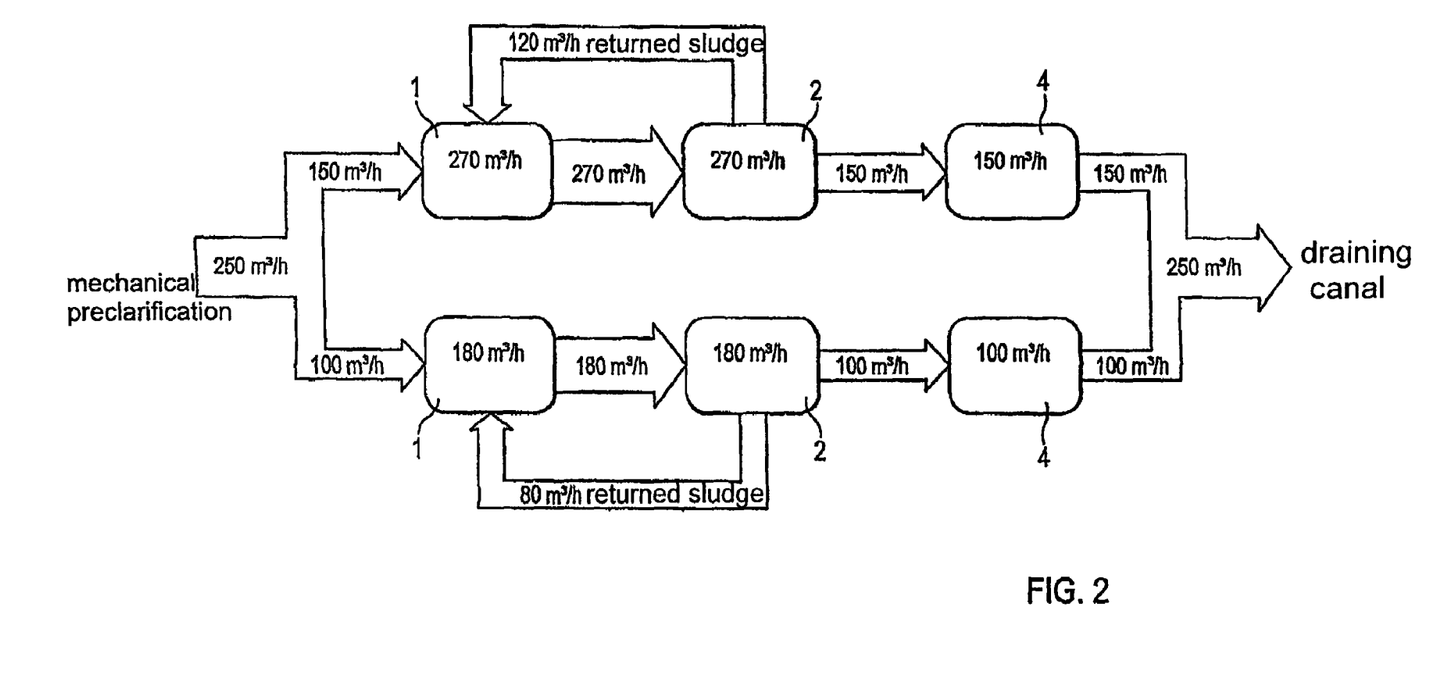
FIG. 2—an extended construction of a plant according to FIG. 1, that is conventionally used to increase the capacity.

FIG. 2 shows the extension of the plant of FIG. 1 that is conventional according to the state-of-the-art, when an additional quantity of wastewater is to be treated. In FIG. 2 the elements, corresponding to those of the embodiment of FIG. 1, have the same reference numerals. If, for example, an increased supplied quantity of 100 m³/h is to be managed, a further secondary settling tank would have had to be built while retaining the generally conventional boundary conditions and the aforementioned plant parameters. However, the result of this would have been that the effective dwell time or contact time would be reduced by approx. 50% while retaining an activation stage of the same magnitude. Due to the shorter contact time in this case a prolongation of the activation stage would be inevitably necessary, as this will be explained in detail in the following. A prolongation of the activation stage, however, makes generally sense only when it is biologically overloaded. However, if only the quantity of wastewater is increased while the substrate contents in the wastewater decreases, then the hydraulic load of the plant should be reduced.

In the case of a 100 m³/h increase of the supply, the following data is valid for the plant shown in FIG. 2:

| | | |
|---|---|---|
| Activation stage: | Wastewater supply: | 250 m³/h (Total of 150 + 100 m³/h) |
| | Wastewater returned sludge: | 200 m³/h (Total of 120 + 80 m³/h) |
| | Capacity of activation tank: | 350 m³ |
| | Actual dwell time: | 0.78 h (calculated from capacity of activation tank 350 m³ and total of wastewater supplies to secondary settlement tanks: 270 + 180 m³/h = 450 m³/h) |

To achieve the dwell time of 1.30 h calculated. in conjunction with FIG. 1, the activation stage has to be prolonged by 67% (from 0.78 h to 1.30 h).

Thus the following conditions will result in the secondary settling tanks:

| Secondary settling tanks: | Settling tank area: | 1 × 198 m² + 1 × 133 m² |
|---|---|---|
| | Capacities of settling tanks: | 1 × 653 m³ + 1 × 436 m³ |
| | Quantity of wastewater: | 250 m³/h |
| | Returned sludge: | 200 m³/h |
| | Actual charging of area: | 1.36 m/h (calculated from the total of wastewater supply 250 m³/h as well as returned sludge 120 + 80 m³/h and the total of the settlement tank areas 198 + 133 = 331 m²) |
| | Actual dwell time: | 2.42 h (calculated from capacity of settling tank 653 m³ and waste water supply incl. return 270 m³/h) |

For such an extension of an existing plant a long time is required. In addition, large financial investments are also required. By virtue of the necessary prolongation of the activation stage by almost 70% a further disproportionately large area is required. The flexibility of the plant with regard to the materials contained in the wastewater (concentration of the materials contained in the wastewater) is limited in the case of such a conventional extension. Otherwise expressed, when the wastewater becomes "thinner" or "thicker", the plant may be considerably impaired with regard to its total operation.

Figure 3:
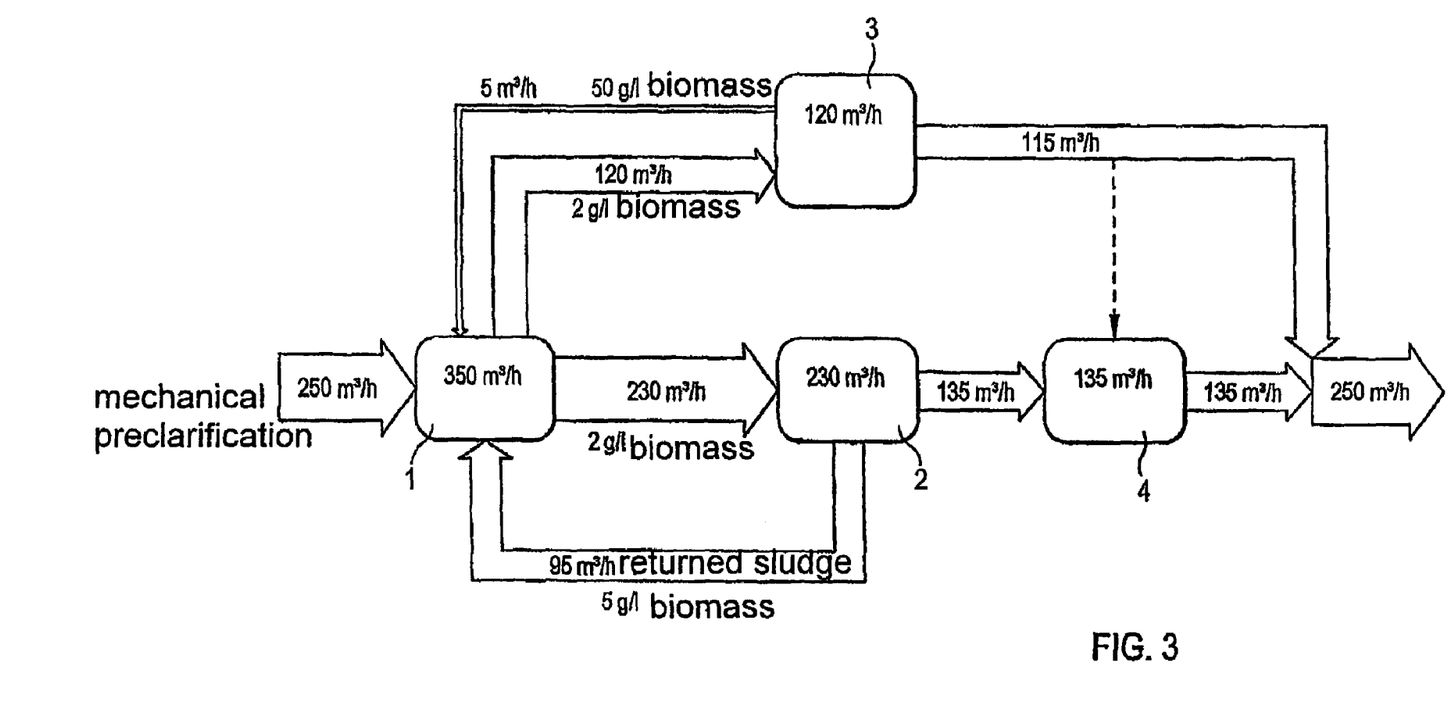
FIG. 3—a wastewater clarification plant according to this invention.

In FIG. 3 an alternative according to the invention of the conventional extension is shown. Connected to an activation stage 1, the exiting wastewater stream is divided into two part-streams, whereby the first part-stream is conveyed, as it is usual, to a secondary settling tank 2, whereas the second part-stream is conveyed to a dehydrating unit 3, for example a sieve belt filter. The separated activated sludge is returned again to the activation stage 1 both from the secondary settling tank 2 and from the dehydrating unit 3. An additional filtering system 4, for example a twin-layer filter, is connected downstream from the secondary settling tank, said filtering system being supplied from the discharge of the secondary settling tank 2, and optionally, also from the discharge of the dehydrating unit 3 (dotted line). However, in the case of an appropriate cleanliness the water, exiting from the dehydrating unit 3, can bypass the after-filtering stage 4 and directly combined with the purified wastewater exiting from the filter plant 4 conveyed to the draining canal.

For a corresponding wastewater supply of 250 m³/h (this corresponds to the conditions of the embodiment according to the state-of-the-art of FIG. 2) the following parameters are obtained for the embodiment according to the invention:

| Activation stage: | Wastewater supply: | 250 m³/h |
|---|---|---|
| | Returned sludge: | 95 m³/h |
| | Return from the dehydrating unit: | 5 m³/h |
| | Capacity: | 350 m³ |
| | Actual dwell time: | 1.00 h (calculated from the activation tank capacity 350 m³ and total of waste water supply 250 m³ and returned sludge 95 + 5 m³/h). |

To achieve an actual dwell time corresponding to the original state, in this case the activation stage has to be prolonged by 30%. Thus the following conditions will prevail for the secondary settling tank:

| Secondary settling tank: | Settlement tank area: | 198 m² |
|---|---|---|
| | Capacity of settlement tank: | 653 m³ |
| | Returned sludge incl. dehydrating unit: | 95 m³/h (total of 90 + 5 m³/h) |
| | Quantity of wastewater (inlet into secondary settling tank): | 230 m³/h |
| | Actual charging of area: | 1.16 m/h (calculated from wastewater 230 m³ and area of settlement tank 198 m²) |
| | Actual dwell time: | 2.61 h (calculated from the settlement tank capacity 653 m³ and quantity of wastewater 250 m³/h) |

In this manner under actual operating conditions no prolongation of the secondary settling tank, with regard to the dwell time, is necessary.

As this embodiment shows, to purify an additional quantity of 100 m³/h wastewater a prolongation of the subsequent clarification in a further secondary settling tank is necessary. In the case of the conventional embodiment shown in conjunction with FIG. 2, the activation is prolonged by approx. 70%, while retaining the basic plant parameters. In contrast to this, when using the device according to the invention, the activation stage has to be prolonged only by 30%. In practice this results in a cost saving of approx. 80%. In addition, the hydraulic load, when compared with a conventional secondary settlement as is shown in FIG. 2, is reduced by approx. 90%. An additional economic advantage is that in the case of a conventional construction an increased area is required due to the required long prolongation of the activation stage. In contrast to this, in the case of the device according to this invention only a slightly larger additional area is necessary for the activation stage. As this can be seen from FIGS. 1 and 3, only a few additional elements are required to convert an existing plant into the device according to the invention, consequently the improvement can be carried out quickly.

Figure 4:
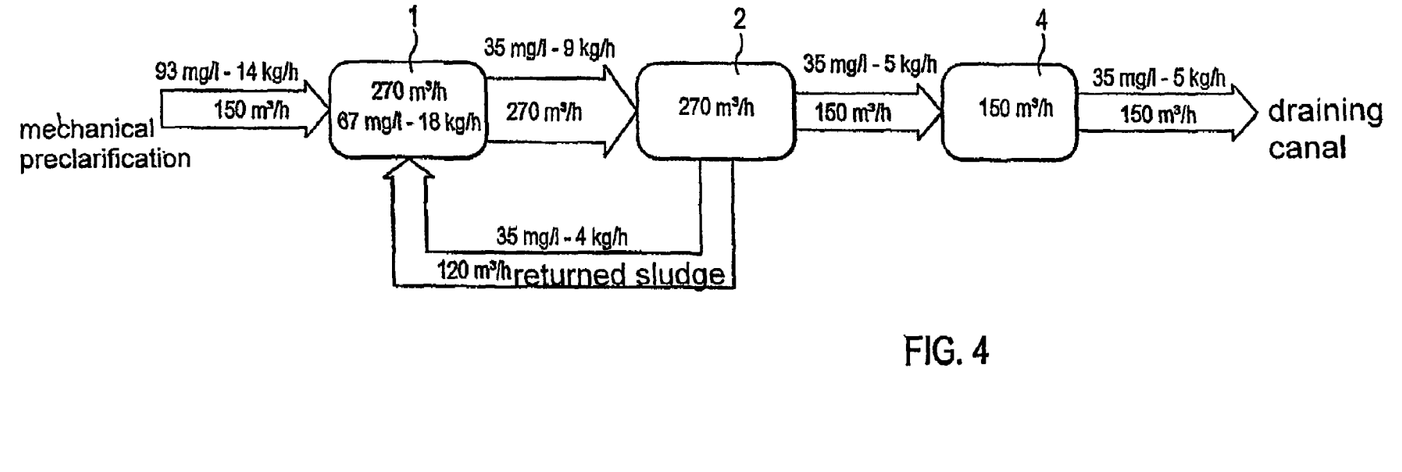
FIG. 4—the wastewater clarification plant according to FIG. 1 wherein the biological load has been taken into account.

FIG. 4 shows the conditions of the biological load in the case of a wastewater purification plant according to the state-of-the-art, as it is illustrated in FIG. 1. The illustrated plant is designed for a biological load of 560 kg COD/day, corresponding to 23 kg/h. In this conjunction under COD load the chemical oxygen demand is understood, that is an indicator for the summary determination of the oxidisable contents of a wastewater. The standardised method to determine this indicator is known to the expert in the field of wastewater technology and therefore is not explained here in detail. At the inlet of the activation the COD load is 93 mg/L, what in the case of a supply of 150 m³/h corresponds to a load of 14 kg/h. The returned sludge contains a load of 35 mg/L, what in the case of a returning quantity of 120 m³/h corresponds to 4 kg/h. From this a biological load of 67 mg/L is obtained for the activation stage, what in the case of a total supply of 270 m³/h corresponds to a load of 18 kg/L, while the purified water exiting from the subsequent clarification has a load of 35 mg/L, that in the case of a water quantity of 150 m³/h corresponds to a load of 5.3 kg/h.

Figure 5:
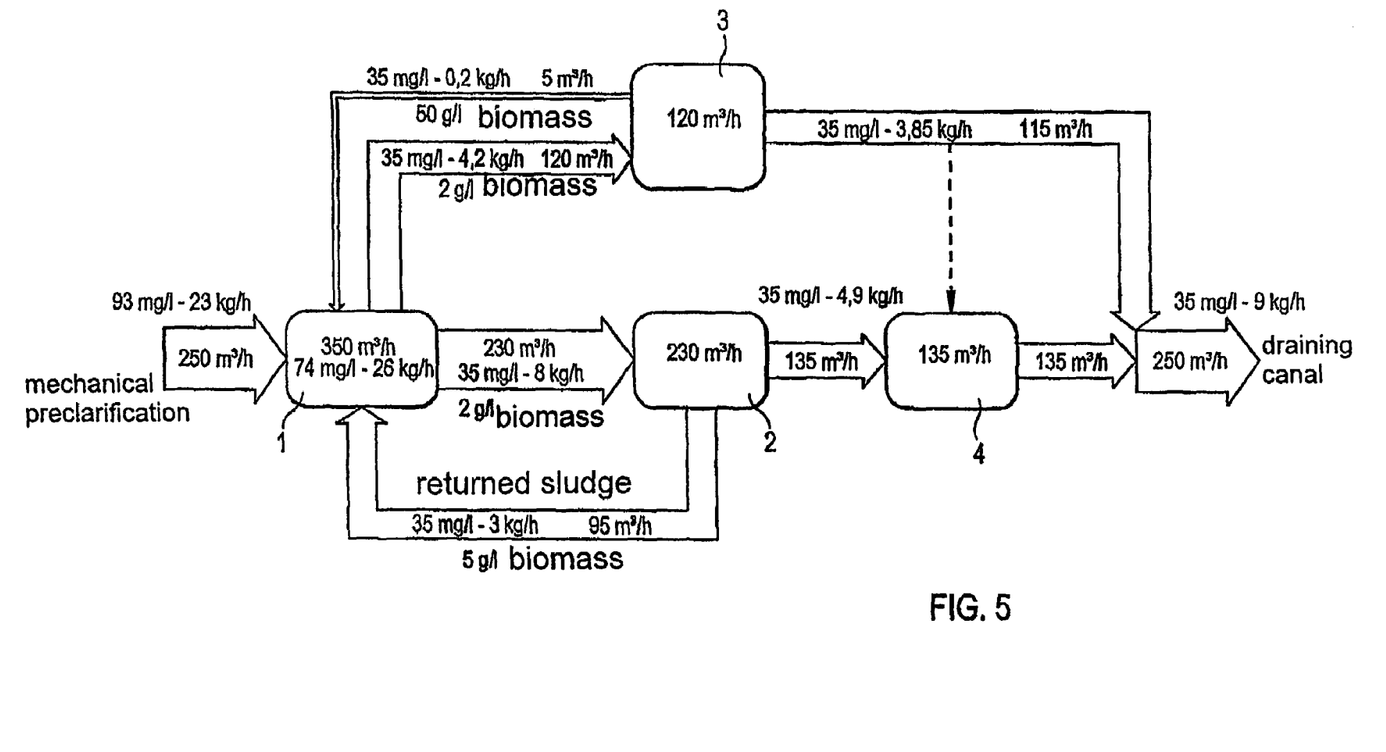
FIG. 5—the wastewater clarification plant of FIG. 3 according to the invention with the biological load integrated.

FIG. 5 illustrates the conditions with regard to the biological load in the case of a plant according to the invention, as it is illustrated in FIG. 3. The biological load at the inlet to the activation stage is also 93 mg/L, what due to the increased supplied quantity of a total of 250 m³/h corresponds here to a biological load of 23 kg/h. In the returned sludge a COD load of 35 mg/L is to be registered, what in the case of a conveyed quantity of 95 m³/h of returned sludge corresponds to a load of 3 kg/h. Added to this is in this case the biological load of the returned sludge from the sieve belt dehydration of 35 mg/L, what in the case of a 5 m³/h corresponds to a load of 0.4 kg/h.

From this the following values are obtained for the biological loads of the individual stages:

| | |
|---|---|
| Activation stage: | 74 mg/L; in the case of a total quantity of 350 m³/h of waste water this corresponds to a value of 26 kg/h; |
| Subsequent clarification: | 35 mg/L; in the case of a wastewater throughput of 230 m³/h this corresponds to a load of 5 kg/h; |
| Sieve belt dehydration: | 35 mg/L; in the case of a total throughput of 120 m³/h this corresponds to a load of 4 kg/h; |
| Draining canal: | 35 mg/L; in the case of a quantity of water of 250 m³/h this corresponds to a load of 8.8 kg/L. |

These examples show, that with the supply concentration (COD load in the wastewater) remaining constant, it is possible make optimal use of the biological capacity of the wastewater plant extended in accordance with the invention. Due to the increased hydraulic output capacity an optimal substrate supply is possible without the necessity of a targeted increase of the supply concentration (adding, for example, of starches).

The teaching according to the invention in its general form does not make any quantitative statements regarding the "portions" explained in steps b), c) and d). However, the person skilled in the art will not have any problem to determine the quantitative relationships necessary in each case. When explaining this invention in conjunction with FIGS. 3 and 5, the particularly advantageous effective part-streams have been described. They are within the limits stated in the following: in the case of step b) a subsequent clarification of at least 5% by volume of the wastewater/activated sludge mixture exiting from the activation stage, in particular approx. 10 to 90% by volume is preferably carried out in a secondary settling tank (2). The same is valid for the "other portion" that is dehydrated in step c), i.e. it is also at least 5% by volume and in particular approx. 10 to 90%. In step d) at least 5% by volume, in particular at least 10% by volume, and quite particularly preferred of approx. 15 to 95% by volume, of the separated activated sludge is returned to the activated sludge tank (1) or preferably at least 0.5% by volume, in particular approx. 1 to 30% by volume of the activated sludge separated in step c) is returned to the activated sludge tank (1).

The invention claimed is:

1. A method to purify wastewaters comprising the steps of:
   a) aerobic clarification of the wastewater by activated sludge in an activation stage;
   b) subsequent clarification of a portion of the wastewater/activated sludge mixture, exiting from the activation stage;
   c) dehydration in a dehydrating unit comprising a sieve belt filter of another portion of the wastewater/activated sludge mixture exiting from the activation stage;
   d) returning at least a portion of the activated sludge separated in step b) to the activation stage; and
   e) guiding the purified wastewater directly from the dehydration step c) to an output, wherein in step e) the activated sludge separated in step b) is returned to the activation stage with a concentration of about 2.5 g/L to about 7 g/L and the activated sludge separated in step c) is returned to the activation stage with a concentration of about 30 g/L to about 60 g/L.

2. A method according to claim 1 wherein:
   the activation stage of step a) is an activated sludge tank;
   the subsequent clarification of step b) takes place in a secondary settling tank;
   the dehydration of step c) takes place in a dehydrating unit; and
   in step d) at least a portion of the activated sludge separated in steps b) and c) is returned to the activated sludge tank.

3. A method according to claim 1, wherein the wastewater/activated sludge mixture exiting from the activation stage is conveyed for the dehydration of step b) with constant flow capacity.

4. A method according to claim 1, wherein the aerobic clarification of step a) is carried out by using a biodisk.

5. A method according to claim 1 wherein the clarification step b) is carried out in a settling tank and the purified wastewater produced in the dehydration step c) is conveyed to a filtering system.

6. A method according to claim 5, wherein the filtering system is a twin-layer filter as the filtering system.

7. A method according to claim 5 wherein at least a part of the purified wastewater from the dehydration step c) is conveyed to the filtering system.

8. A method according to claim 1 wherein the activated sludge separated in step b) is returned to the activation stage with a concentration of from about 4 g/L to about 5.5 g/L.

9. A method according to claim 1, wherein the activated sludge separated in step c) is returned to the activation stage with a concentration of from about 35 g/L to about 55 g/L.

10. A system to purify wastewaters comprising:
    an activation stage for the aerobic clarification of the wastewater,
    a secondary settling tank for the fluid/solid matter separation;
    a dehydrating unit comprising a sieve belt filter to dehydrate the sludge of the fluid/solid separation, wherein:
       both the secondary settling tank and the dehydrating unit are connected with the activation stage by means of at least two pipeline systems,
       a pipeline that connects the discharge of the activation stage to the secondary settling tank and the dehydrating unit, and
       a supply line of the wastewater/activated sludge mixture and a further pipeline that returns activated sludge concentrated in the secondary settling tank and in the dehydrating unit to the activation stage, and
    wherein the discharge of the dehydrating unit bypasses the secondary settling tank.

11. The system according to claim 10 further comprising a device for the constant conveying of the wastewater/activated sludge mixture from the activation stage to the dehydrating unit.

12. The system according to claim 11, wherein the device for constant conveying is a centrifugal pump.

13. The system according to claim 10 wherein the activation stage comprises at least one biodisk.

14. The system according to claim 10, further comprising a filtering system connected downstream of the secondary settling tank.

15. The system according to claim 14, wherein the filtering system comprises a twin-layer filter.

16. The system according to claim 14, wherein the discharge of the dehydrating unit is connected to the filtering system.

17. The system according to claim 10 further comprising a mechanical cleaning stage connected upstream from the activation stage.

18. The system according to claim 10 further comprising a metering and feeding device connected upstream of the dehydrating unit to feed flocculant.

19. The system according to claim 17, further comprising a measuring device to measure the turbidity contents of the purified wastewater connected downstream of the dehydrating unit, and a controlling device to control the metering device as a function of the turbidity contents as measured by the measuring device.

20. The system according to claim 10, wherein the output of the secondary tank supplied to the activation stage is activated sludge with a concentration of from about 2.5 g/L to about 7 g/L and the output of the dehydrating unit to the activation stage is activated sludge with a concentration of from about 30 g/L to about 60 g/L.

* * * * *